(12) United States Patent
Belinda et al.

(10) Patent No.: US 7,686,556 B2
(45) Date of Patent: Mar. 30, 2010

(54) WOOD TRUSS FASTENER

(75) Inventors: Richard Belinda, Westfield, MA (US); David Chapman, Easthampton, MA (US)

(73) Assignee: Handy & Harman, Rye, NY (US)

( * ) Notice: Subject to any disclaimer, the term of this patent is extended or adjusted under 35 U.S.C. 154(b) by 890 days.

(21) Appl. No.: 11/036,031

(22) Filed: Jan. 14, 2005

(65) Prior Publication Data
US 2005/0155311 A1    Jul. 21, 2005

Related U.S. Application Data (60) Provisional application No. 60/537,681, filed on Jan. 20, 2004.

(51) Int. Cl.
    *F16B 25/10*    (2006.01)
(52) U.S. Cl. .................. 411/387.2; 52/698
(58) Field of Classification Search .............. 52/705, 52/698, 506.05; 411/386, 387.1–387.8
    See application file for complete search history.

(56) References Cited

U.S. PATENT DOCUMENTS

| | | | | | |
|---|---|---|---|---|---|
| 1,084,643 | A | * | 1/1914 | Lasater | 411/399 |
| 3,045,523 | A | * | 7/1962 | Reed | 411/387.1 |
| 4,655,661 | A | * | 4/1987 | Brandt | 411/387.1 |
| 5,015,134 | A | * | 5/1991 | Gotoh | 411/386 |
| 5,882,162 | A | * | 3/1999 | Kaneko | 411/411 |
| 5,987,837 | A | * | 11/1999 | Nelson | 52/506.05 |
| 6,328,516 | B1 | * | 12/2001 | Hettich | 411/387.2 |
| 6,332,741 | B1 | * | 12/2001 | Janusz | 411/412 |
| 6,739,815 | B2 | * | 5/2004 | Takasaki | 411/387.1 |

* cited by examiner

*Primary Examiner*—Robert J Canfield
*Assistant Examiner*—Christine T Cajilig
(74) *Attorney, Agent, or Firm*—Alix, Yale & Ristas, LLP (57) ABSTRACT

A truss fastener which includes a shaft having a head and a tip. Threading extends along the shaft from the tip end toward the head end of the shaft. The threading is interrupted, abbreviated, and/or otherwise separated by wings projecting from the surface of the shaft. The interrupting projection extends in a generally oblique orientation to the center axis of the fastener.

14 Claims, 9 Drawing Sheets

WOOD TRUSS FASTENER

CROSS REFERENCE TO RELATED APPLICATION

This application claims the benefit of U.S. Provisional Application No. 60/537,681 filed Jan. 20, 2004.

FIELD OF THE INVENTION

The invention generally relates to construction material fastening. In particular, the invention relates to the fastening together of wooden truss assemblies.

BACKGROUND OF THE INVENTION

The construction of commercial buildings, residences and other structures often includes the use of wood truss assemblies. Typically in modern construction these truss assemblies incorporate the use of laminated elements. These laminated structures allow for high strength construction due to their typically high strength to weight ratio, their dimensional stability, and their rigidity. Often these laminated building elements are referred to as engineered lumber, and include such products as laminated veneer lumber (LVL), parallel strand lumber (PSL) and laminated strand lumber (LSL). These laminated building elements typically contain a minimal incorporation of defects such a core voids, slope of grain, knotholes, and delaminated areas which make their use extremely appealing.

However, the assembly of these laminated elements is often problematical through the use of conventional fasteners which cause, among other things, splitting, splintering, cracking, fracturing, and or other cosmetic and/or structural damage to the laminated element. Such cosmetic and/or structural damage can significantly negatively impact the overall structure. A solution to this problem is highly desired by those associated with structure construction.

SUMMARY OF THE INVENTION

Briefly stated, the present invention in a preferred form is a truss fastener that includes a shaft having a head end and a tip end. Threading is present on the shaft and extends along the shaft from the tip end toward the head end of the shaft. The threading is interrupted, abbreviated, and/or otherwise separated by projections which extend from the surface of the shaft and/or from portions of the threading. The projections extend in a generally oblique direction to an axial center of the fastener. The interrupting projections may project from a profiled portion of the fastener tip end and may include an arcuate leading edge.

The present invention also includes a method of utilizing the fastener in laminated building elements such as LVL and LSL.

An object of the present invention is to prevent and/or reduce damage to material into which the fastener is embedded.

A further object of the present invention is to provide a non-damaging, reliable, and effective fastener for laminated building elements such as LVL and LSL.

BRIEF DESCRIPTIONS OF THE DRAWINGS

Other objects and advantages of the invention will be evident to one of ordinary skill in the art from the following detailed description with reference to the accompanying drawings, in which.

DETAILED DESCRIPTION OF THE PREFERRED EMBODIMENT

With reference to the drawings wherein like numerals represent like parts throughout the several figures, a wood truss fastener in accordance with the present invention is generally designated by the numeral 10.

Figure 2A:
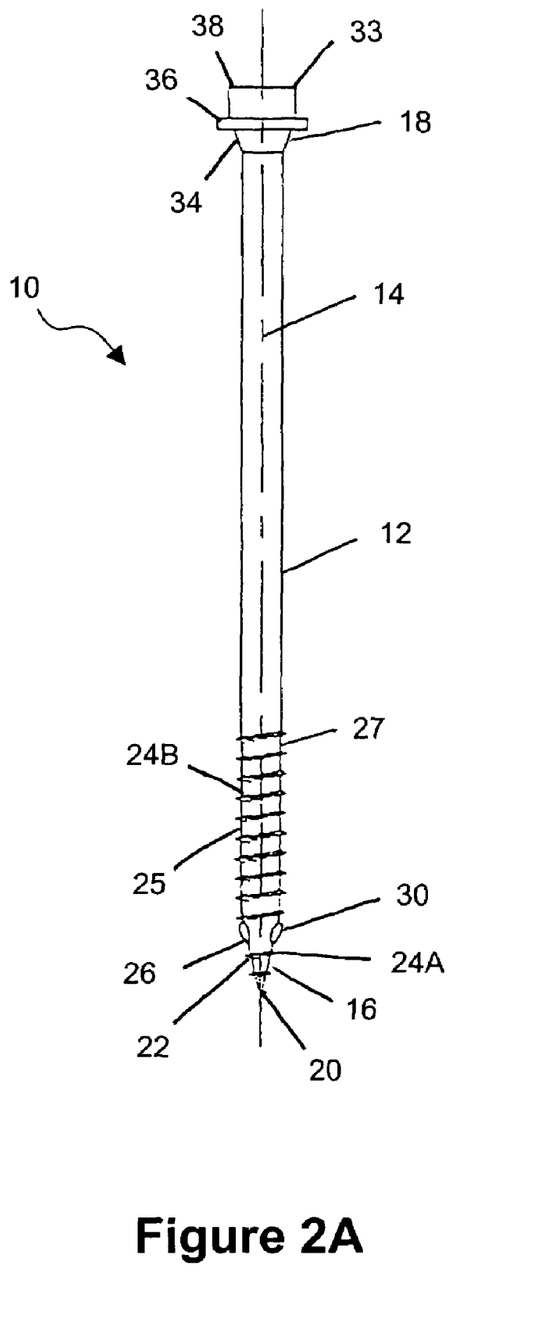
FIGS. 2A and 2B show a side view and a top view, respectively, of a wood truss fastener consistent with the present invention.

In one embodiment of the present invention, as shown in FIG. 2A, the fastener 10 includes a shaft 12 having a central axis 14. The shaft 12 has a tip end 16 and a head end 18. The tip end 16 may have a point 20 to aid in penetration of material into which the fastener 10 is driven. The tip end 16 may include a profiled portion, for example, a tapered portion 22 which is located between the point 20 and the beginning of a substantially cylindrical portion 25 of the shaft. The shaft 12 includes threading, for example, a first threading 24B, and a second threading 24A. The threading 24A, 24B projects from the shaft and is disposed helically about the shaft 12 in a direction from the point 20 toward the head end 18 of the shaft. Projecting from the shaft 12 is at least one wing 26. There may be one, two, three, or more wings 26 that extend from the shaft 12 at locations about the shaft 12. The wing 26 may interrupt or separate a portion or portions of the threading 24A, 24B.

Figure 3:
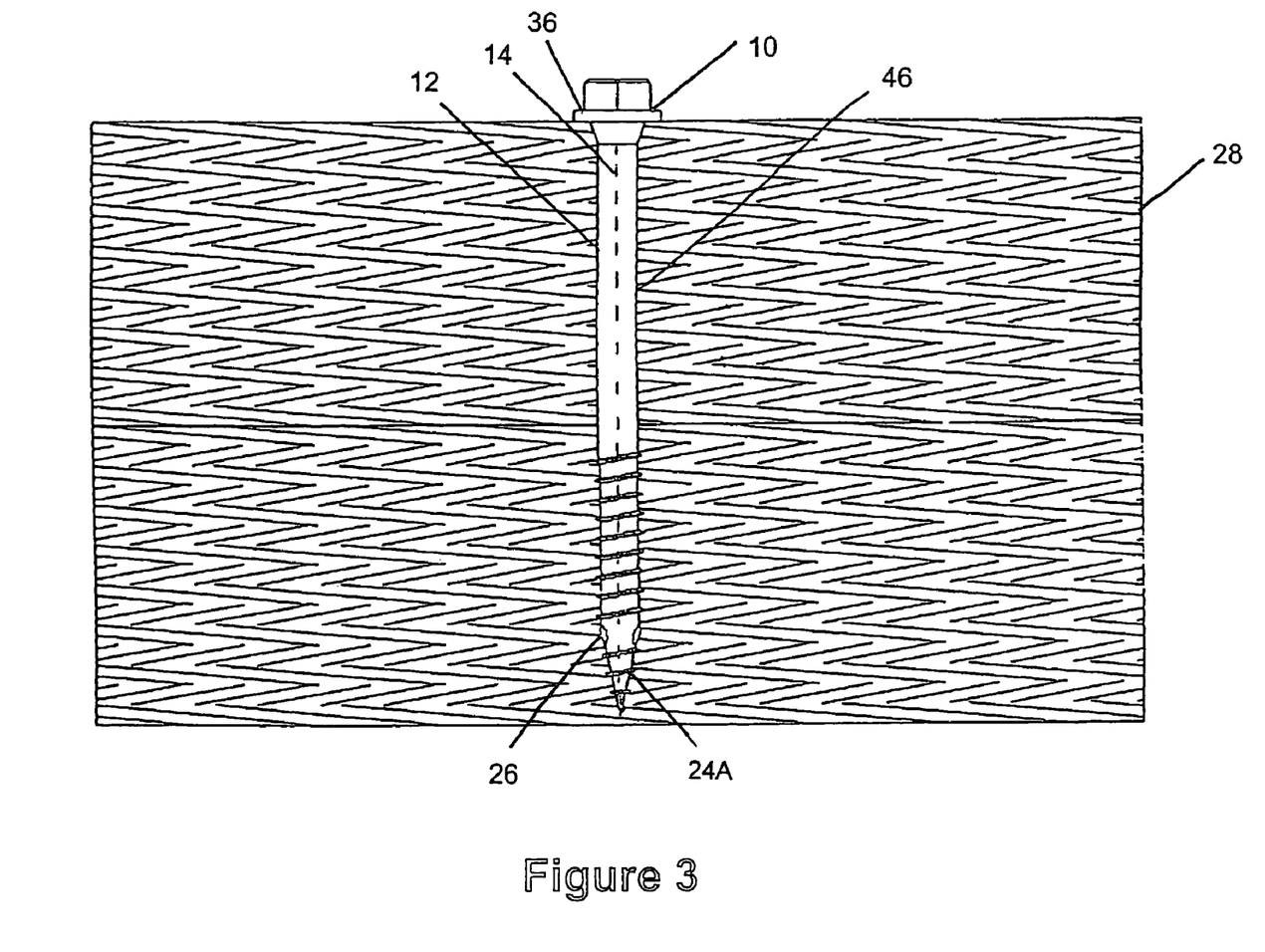
FIG. 3 shows a wood truss fastener consistent with the present invention wherein the fastener is embedded in two laminated strand lumber members shown in section.

In one embodiment of the invention, the wing 26 is positioned proximate the tip of the fastener. The wing 26 may be wholly or partially located on the tapered portion 22 of the fastener. The wing 26 projects away from the surface of the fastener such that a portion or portions of the wing 26 extend below, at, or above the height of the threading 24A, 24B. The wing 26 functions, for example, to remove, cut, shave, or otherwise displace lumber material 28, as shown in FIG. 3, such that the shaft 12, threading 24A, 24B, and/or other portions of the fastener 10 do not split, splinter, crack, or otherwise fracture the lumber material 28.

In one embodiment of the invention, the wing 26 extends along a portion of the shaft 12 in an orientation which is substantially oblique to the fastener center axis 14. The wing 26 may also have an orientation such that the wing 26 has a pitch that greatly exceeds the pitch of the threading 24A, 24B. For example, the wing 26 may traverse a helical path about the center axis 14.

Figure 1:
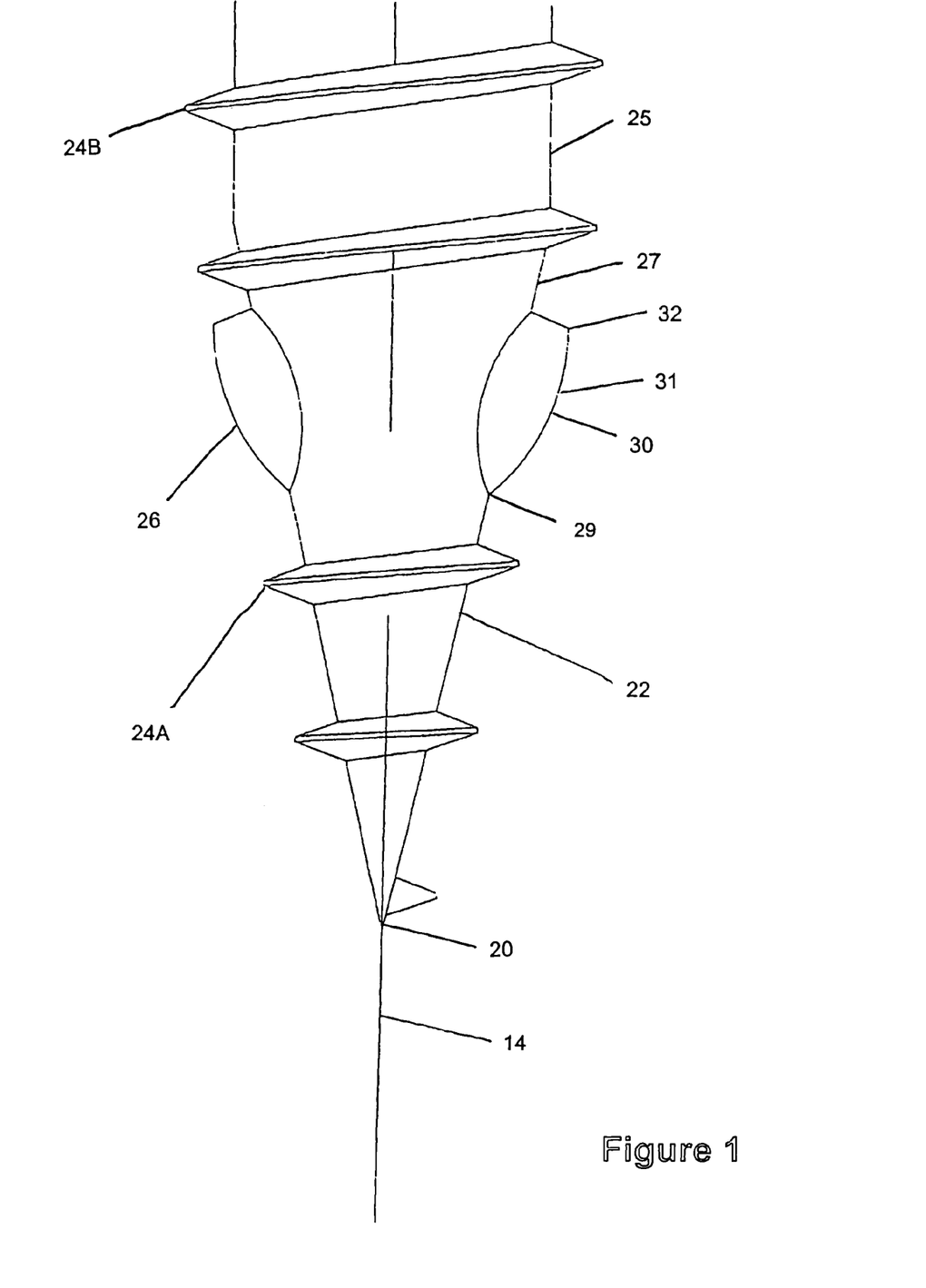
FIG. 1 shows an enlarged tip end of a wood truss fastener consistent with the present invention.

In one embodiment of the invention, the wing 26, as shown in FIG. 1, has an entry end 29, an arcuate portion 30 having a cutting edge 31, and a trailing edge 32. The entry end 29 may be obliquely diverge away from the shaft surface 25 at an angle which is sufficiently shallow such that contact of the wing 26 with the lumber material is relatively gradual as the fastener 10 is embedded in the lumber material. The arcuate portion 30 of the wing includes a cutting edge 31 which is present on at least the portion of the wing that projects the farthest away from the shaft surface 25 between the entry end 29 and the trailing end 32. The trailing end 32 of the wing may be abruptly angled such that it has a substantially perpendicular orientation relative to the shaft surface at which it is positioned. For example, the trailing end 32 of the wing can be substantially perpendicular relative to a shaft surface 27 of the tapered portion 22.

In one embodiment of the present invention, the distance between the trailing end 32 and the center axis 14 is greater than the distance between the entry end 29 and the center axis.

In one embodiment of the present invention, the wing 26 protrudes outward from the center axis 14 to a greater distance than the distance from the center axis 14 to a surface of an unthreaded portion of the substantially cylindrical portion of the shaft.

Figure 9:
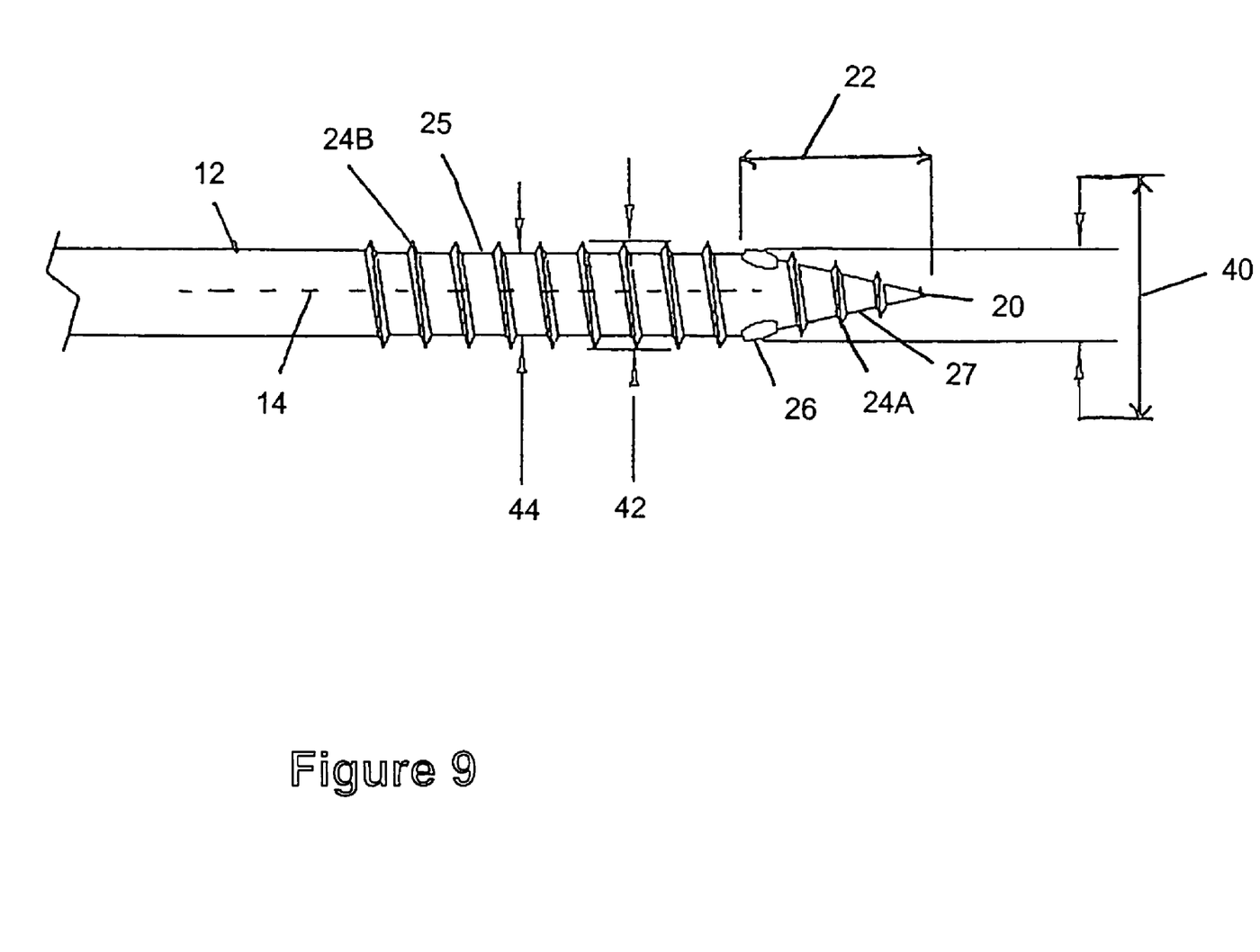
FIG. 9 shows an enlarged tip end portion of a wood truss fastener consistent with the present invention.

In one embodiment of the present invention, as shown in FIG. 9, a pair of wing 26 structures may be located on the tapered portion 22 of the fastener. The wing 26 has an outer diameter 40 that is less than the outer diameter 42 of the threading 24B. For example, the outer wing diameter 40 may be about 0.240 to about 0.270 inches, and the threading outer diameter 42 may be about 0.280 to about 0.288 inches. The diameter 44 of the substantially cylindrical portion 25 of the shaft may be about 0.215 inches. The threading 24B located on the substantially cylindrical portion 25 may have about 9 threads per inch and may have a thread angle of about 40°.

It should be understood that the wing 26 may be altered in shape, angle, hardness, and/or any other property or relationship to the fastener to reduce problems associated with conventional fasteners. The shape, angle, and hardness of the wing 26 can independently be varied during manufacture such that the physical properties of the lumber material are accounted for. For example, in lumber material having a high density the wing preferably has a hardness that resists dulling.

Figure 2B:
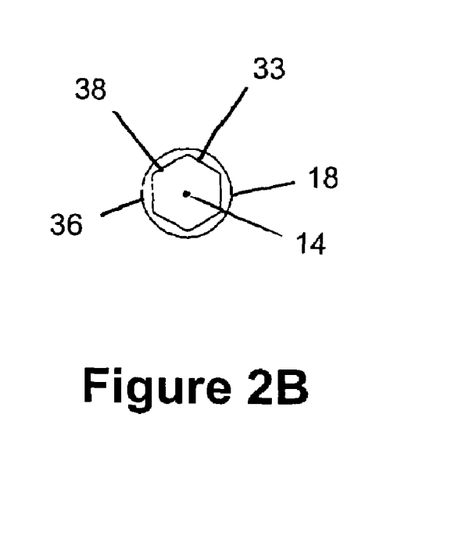

In one embodiment of the present invention, as shown in FIG. 2A, the head end 18 has a head 33. The head 33 includes a tapered neck 34 that extends from the substantially cylindrical portion of the shaft to a lip 36. The lip 36 projects in a substantially perpendicular orientation from the faster central axis 14. The lip 36, as shown in FIG. 3, seats against a surface of the lumber material 28 when the fastener 10 has been fully embedded in the lumber material. The head 33, as shown in FIGS. 2A and 2B also includes a tool engagement portion 38. The tool engagement portion 38 in a preferred form is a hexagonal structure that is engageable with, for example, a socket wrench or box end wrench tool (not shown).

Figure 4:
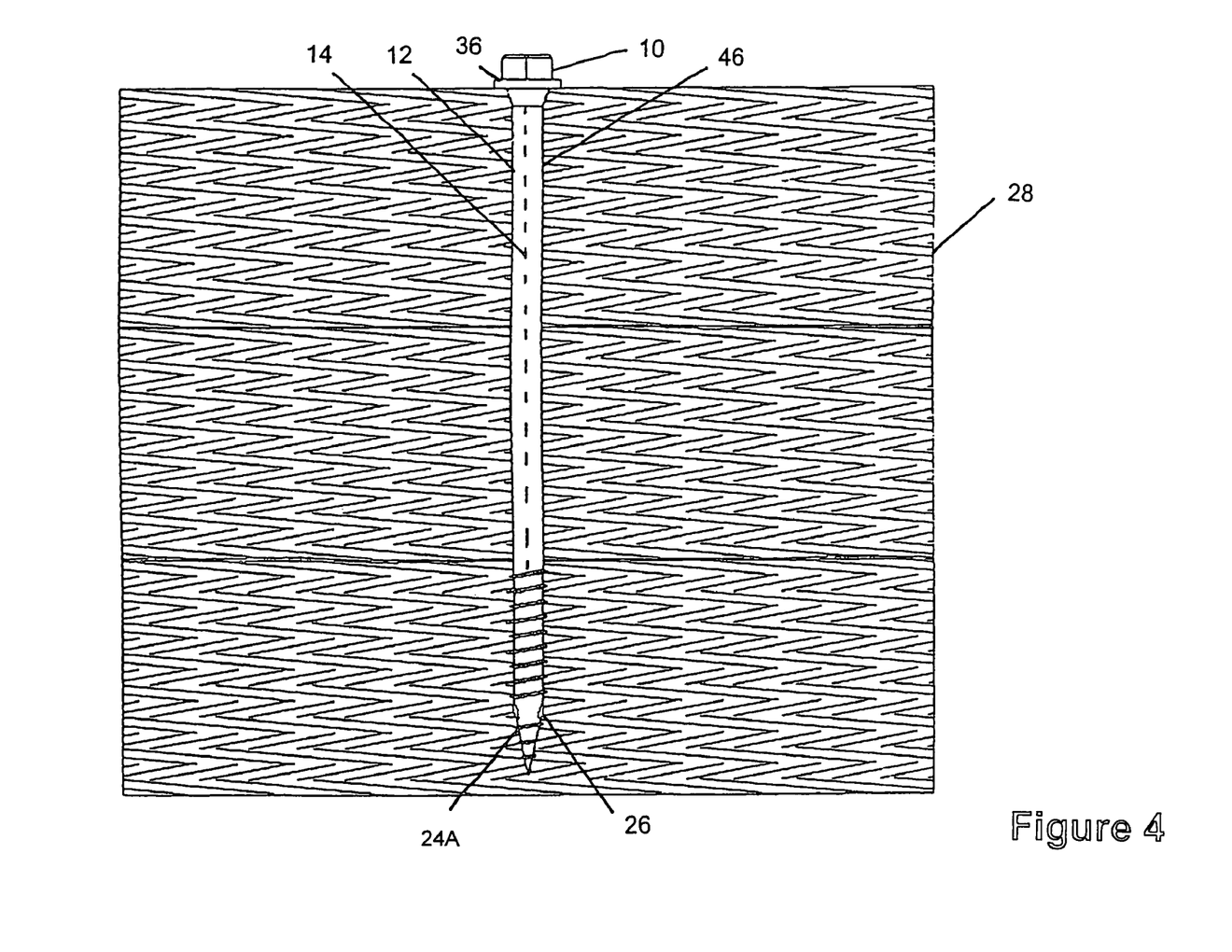
FIG. 4 shows a wood truss fastener consistent with the present invention wherein the fastener is embedded in three laminated strand lumber members shown in section.
Figure 5:
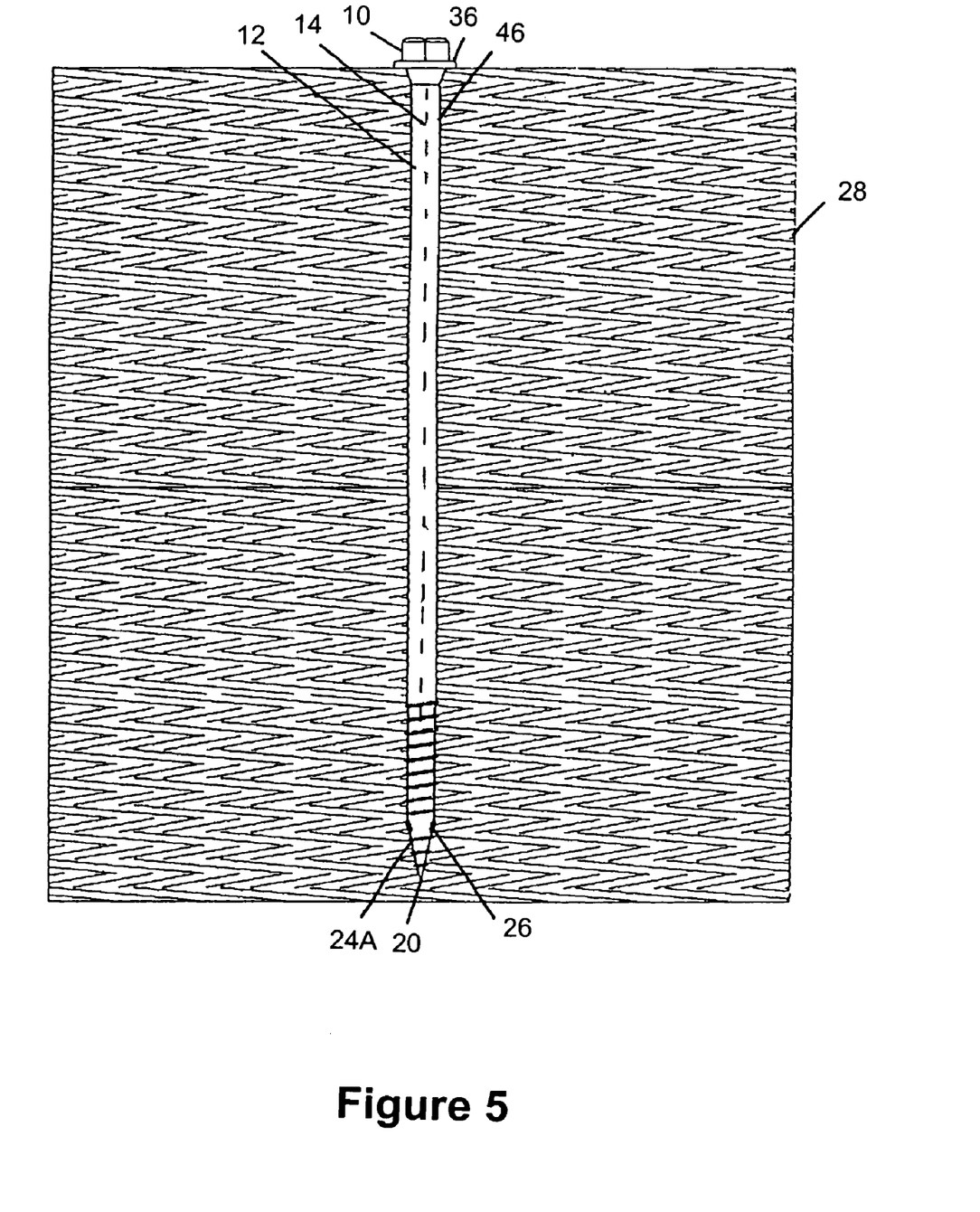
FIG. 5 shows a wood truss fastener consistent with the present invention wherein the fastener is embedded in two laminated strand lumber members shown in section.
Figure 6:
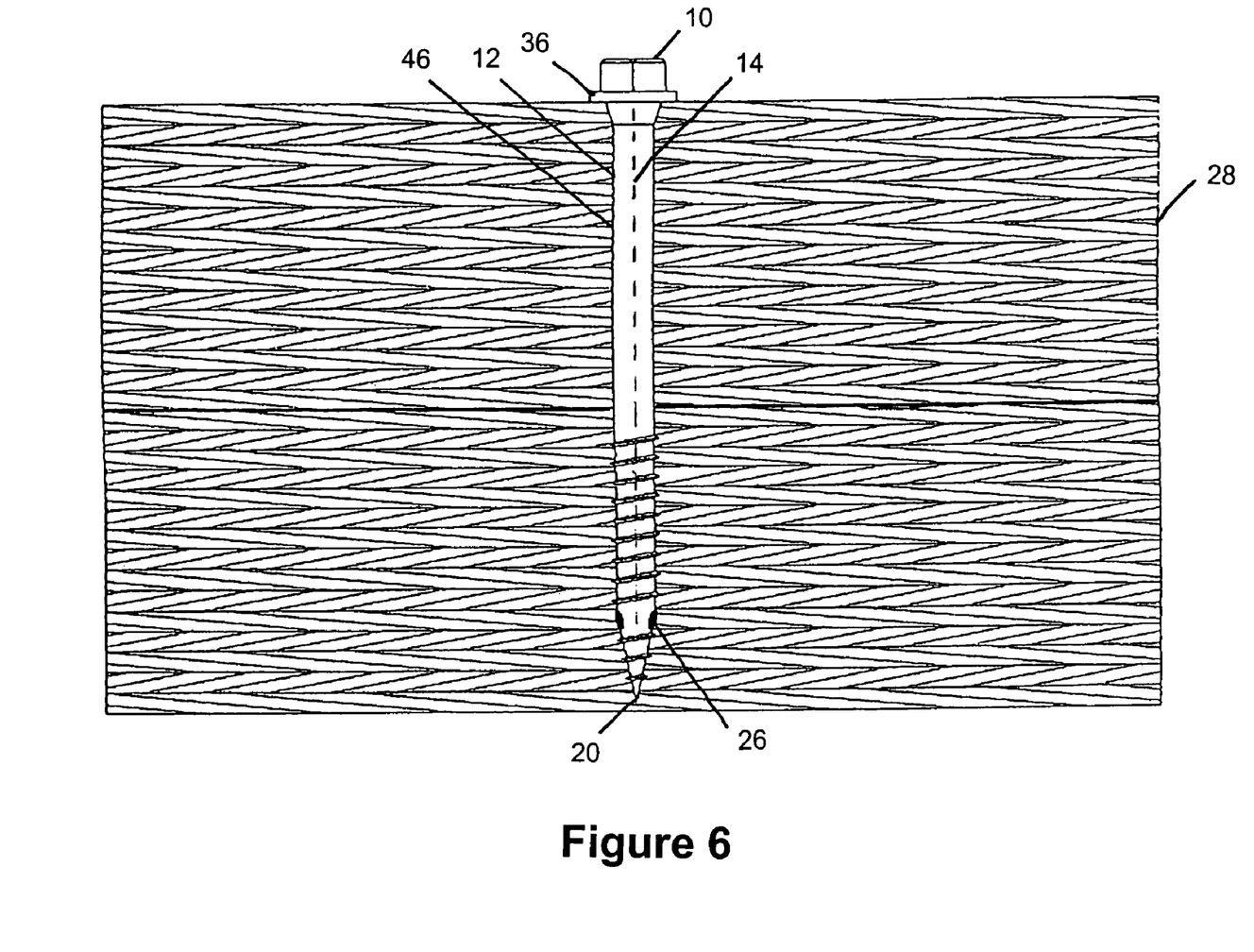
FIG. 6 shows a wood truss fastener consistent with the present invention wherein the fastener is embedded in two laminated veneer lumber members shown in section.
Figure 7:
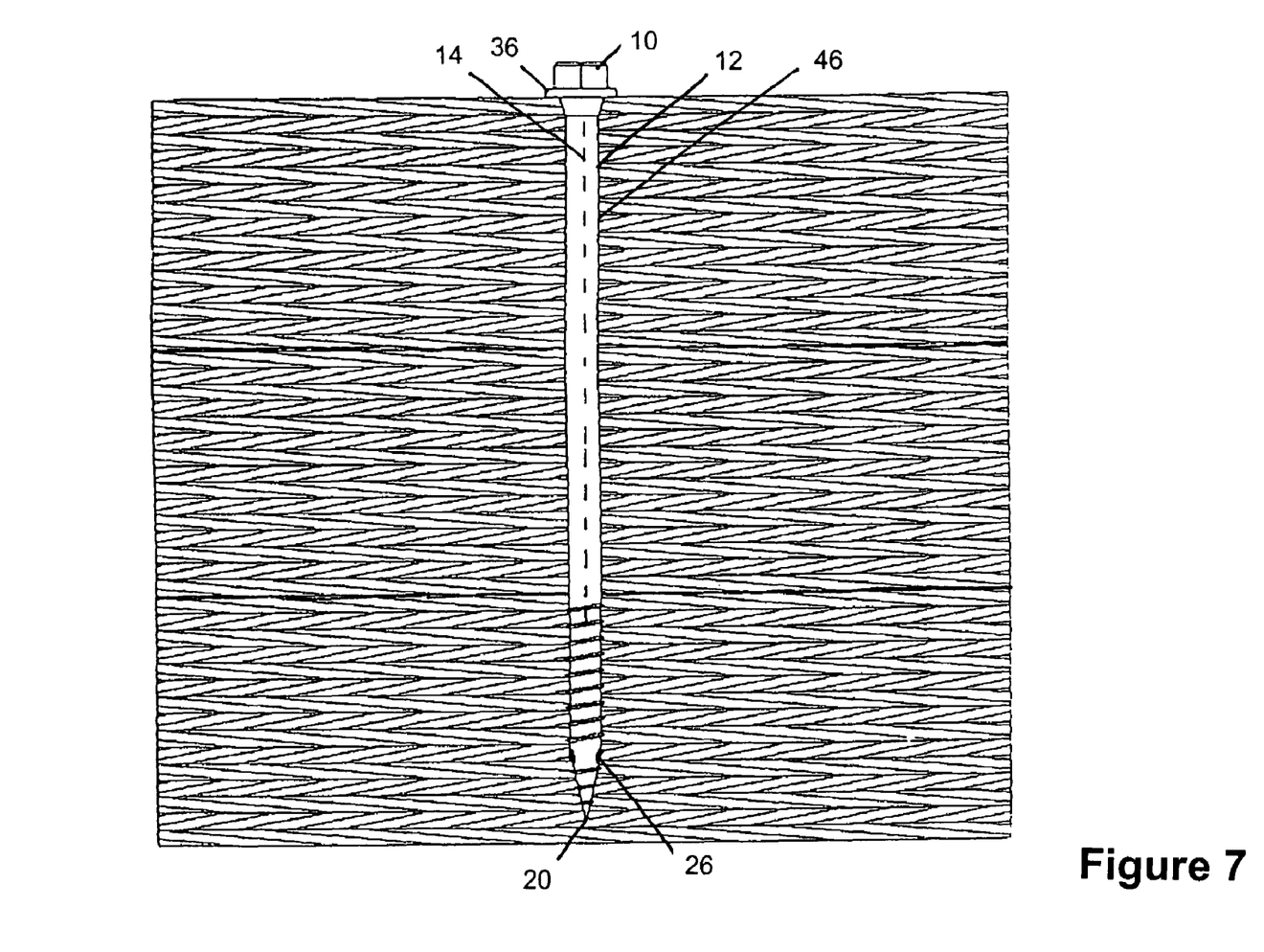
FIG. 7 shows a wood truss fastener consistent with the present invention wherein the fastener is embedded in three laminated veneer lumber members shown in section.
Figure 8:
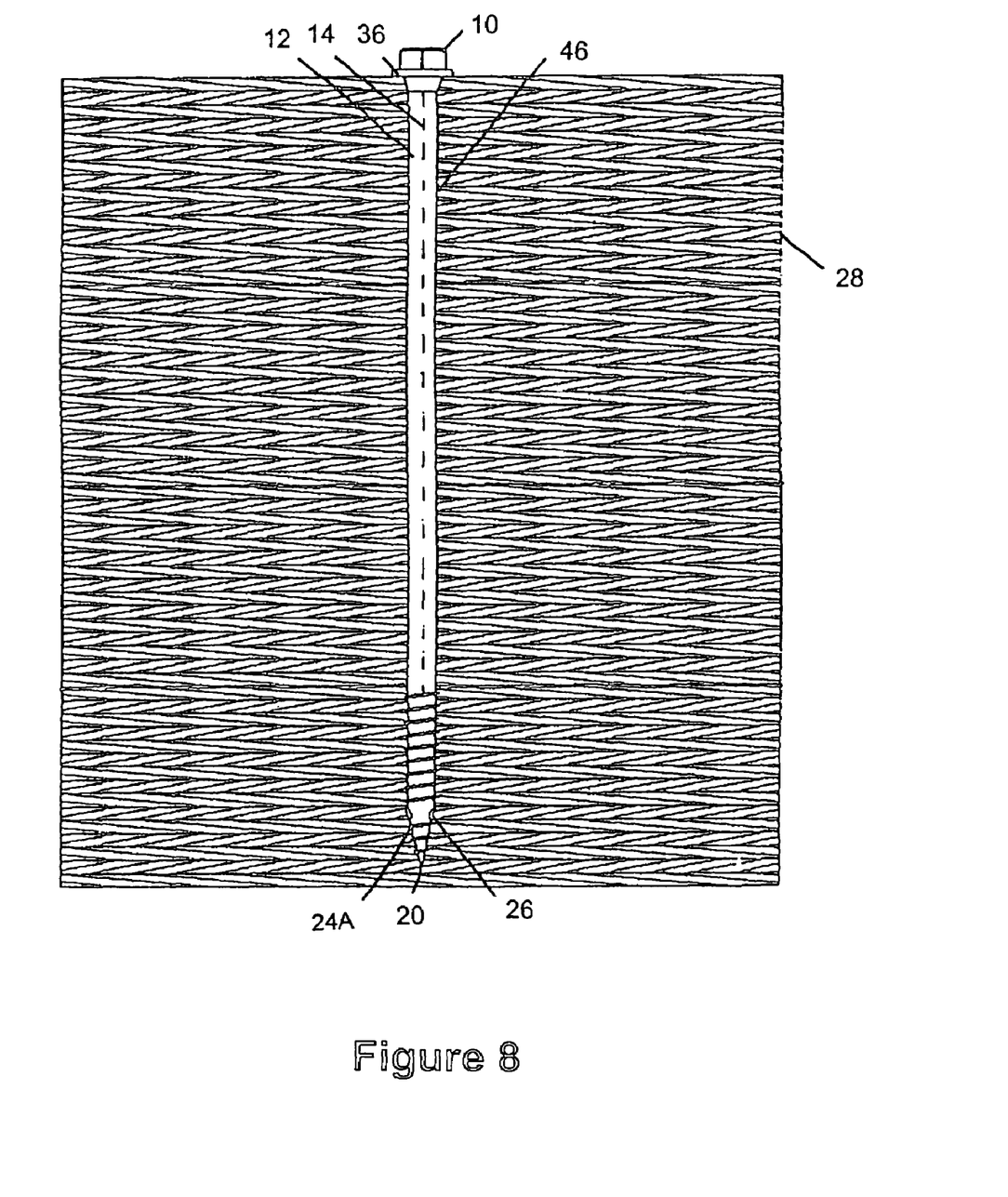
FIG. 8 shows a wood truss fastener consistent with the present invention wherein the fastener is embedded in four laminated veneer lumber members shown in section.

The fastener 10 may be manufactured of differing lengths depending on the intended application. For example, as shown in FIGS. 3-8, the fastener may be 3⅜", 5", 6.7", and may be used in conjunction with lumber material 28 that is of the laminated strand type as shown in FIGS. 3-5, or of the laminated veneer type as shown in FIGS. 6-8.

In one embodiment of the invention, the fastener point 20 is placed against a lumber material 28 and is rotatably driven so that the threading 24A enters the lumber material 28. As the threading 24A pulls the fastener into the lumber material 28, the wing 26 structures engage with the lumber material 28 and shave, cut, ream, displace, remove, and/or otherwise alter the forming fastener entry point. This alteration to the forming fastener entry point allows the threading 24B located on the substantially cylindrical portion 25 of the shaft to enter the lumber material 28 with less disturbance to the material.

In operation, in one embodiment of the invention, the point 20 of the fastener 10 is contacted with, for example, a laminated strand lumber member a laminated veneer lumber member. The fastener 10 is then rotated, for example by a tool engaged with the tool engagement portion 38 of the head, such that the threading 24A in proximity to the fastener point 20 engages the lumber material. The threading 24A draws the fastener shaft 12 into the lumber material. A tapered portion 22 of the shaft near the point 20 displaces a portion of the lumber material away from the center axis 14 of the fastener as the fastener travels into the lumber material. As the fastener 10 continues travelling into the material, the wing 26 contacts the lumber material. As the wing 26 contacts that lumber material during rotation of the fastener 10, the wing 26 reams away the displaced lumber material portion. As a substantially non-tapering portion of the shaft reaches the material, a bore hole 46, as shown in FIGS. 3-8, has been created by the reaming. For example, the bore hole 46 produced by the wing 26 may be dimensioned to be less than, equal to, and/or greater than a portion or portions of the shaft 12. The bore hole 46 created by the wing 26 operates in some instances to remove material that would otherwise be forced away from the fastener 10 laterally. This laterally forced material in some circumstances contributes to a force which can split, fracture, chip, deform, or otherwise alter the construction material in a way which is undesirable.

While an embodiment of the foregoing invention has been set forth for purposes of illustration, the foregoing description should not be deemed a limitation of the invention herein. Accordingly, various modification, adaptations and alternatives may occur to one skilled in the art without departing from the spirit and the scope of the present invention.

The invention claimed is:

1. A truss fastener comprising:
a shaft having a center axis, a tip and a head, said shaft including a profiled portion located proximate said tip and a cylindrical portion located between said profiled portion and said head;
a first threaded portion on said cylindrical portion;
a second threaded portion on said profiled portion; and
a wing positioned on said profiled portion between said first and second threaded portions, said wing protruding radially relative to said center axis from a surface of said shaft and extending in an oblique orientation relative to the center axis along a portion of said shaft surface.

2. The truss fastener of claim 1, wherein the wing includes an arcuate portion having a cutting edge.

3. The truss fastener of claim 1, wherein the wing includes a trailing portion which is substantially perpendicular to a surface of the profiled portion.

4. The truss fastener of claim 1, wherein the profiled portion has a tapered configuration.

5. The truss fastener of claim 1, wherein there are a plurality of wings protruding from the shaft surface.

6. The truss fastener of claim 1, wherein the second threaded portion is proximate an entry end of the wing and the first threaded portion is proximate a trailing portion of the wing.

7. The truss fastener of claim 6, wherein the first threaded portion has about 9 threads per inch and the threads have a thread angle of about 40°.

8. The truss fastener of claim 6, wherein the wing protrudes outward from the center axis to a lesser distance than the first threaded portion protrudes outward from the center axis.

9. The truss fastener of claim 1, wherein the wing protrudes outward from the central axis to a greater distance than the distance from the center axis to a surface of an unthreaded portion of the substantially cylindrical portion of the shaft.

10. The truss fastener of claim 1, wherein the head has a tool engagement portion and a tapered neck which extends between a substantially cylindrical portion of the shaft and a lip.

11. The truss fastener of claim 10, wherein the tool engagement portion is hexagonal.

12. A truss fastener and engineered lumber material assembly comprising:
- at least one engineered lumber material element having a bore hole formed by the truss fastener;
- the truss fastener having a shaft with a center axis extending into the bore hole of the engineered lumber material, a tip, a profiled portion proximate the tip, and a head in contact with a surface of the engineered lumber material, said shaft having a threaded cylindrical portion engaged with the engineered lumber material, said threaded portion having threads that protrude a first distance outwardly from the center axis;
- a wing extending a second distance outwardly from the center axis of the shaft into a portion of the laminated construction material and extending in an oblique orientation relative to the center axis along a portion of the shaft surface, said first distance being greater than said second distance.

13. A method of fastening engineered lumber materials together comprising:
- positioning at least two engineered lumber construction members in surface-to-surface relationship;
- placing a distal end of an engineered lumber material fastener in contact with a surface of one of the engineered lumber members;
- rotatably driving the fastener such that a threaded portion of a shaft of the fastener engages the engineered lumber members;
- reaming an engineered lumber members portion adjacent to a surface of the shaft with a wing which extends from the shaft in an oblique orientation relative to a center axis of the shaft, said wing extending along a portion of the shaft surface;
- engaging the reamed portion with a threaded portion on a cylindrical portion of the shaft; and
- seating a head of the fastener against the surface of the one engineered lumber member.

14. The method of fastening engineered lumber members together of claim 13, wherein the step of reaming includes forming a bore hole in the engineered lumber members.

* * * * *